(12) United States Patent
Gu

(10) Patent No.: US 6,499,755 B2
(45) Date of Patent: Dec. 31, 2002

(54) OPERATION ARRANGEMENT FOR A TWIST VEHICLE

(75) Inventor: Hong-Jiun Gu, 6 Fl. No. 67, Lane 27, Alley 372, Sec. 5, Chung Hsu East Road, Taipei (TW)

(73) Assignees: Hong-Jiun Gu, Taipei (TW); Jar Chen Weng, Cerritos, CA (US)

( * ) Notice: Subject to any disclaimer, the term of this patent is extended or adjusted under 35 U.S.C. 154(b) by 0 days.

(21) Appl. No.: 09/910,610

(22) Filed: Jul. 23, 2001

(65) Prior Publication Data

US 2001/0050470 A1 Dec. 13, 2001

(30) Foreign Application Priority Data

Jun. 9, 2000 (TW) ....................... 89118194 A

(51) Int. Cl.$^7$ ................................. B62M 1/00
(52) U.S. Cl. ................ 280/210; 280/200; 280/240; 280/242.1; 280/1.181
(58) Field of Search .............. 472/135; D12/1, D12/83, 175, 159; D21/426, 427, 533, 548; 446/431, 437, 450; 180/7.1; 280/1.181, 1.175, 1.191, 1.202, 200, 263, 267, 281.1, 211, 240, 242.1, 249, 210

(56) References Cited

U.S. PATENT DOCUMENTS

| | | | | |
|---|---|---|---|---|
| 3,863,950 A | * | 2/1975 | Jordan | ..................... 280/1.181 |
| 3,902,739 A | * | 9/1975 | Kimura | ...................... 280/249 |
| 4,200,304 A | * | 4/1980 | Hwang | ....................... 280/218 |
| 6,386,304 B1 | * | 5/2002 | Wang | ....................... 180/65.1 |
| 2001/0040352 A1 | * | 11/2001 | Wang et al. | ............. 280/87.01 |
| 2002/0024188 A1 | * | 2/2002 | Gu | .............................. 280/16 |
| 2002/0074180 A1 | * | 6/2002 | Gu | ............................. 180/312 |

FOREIGN PATENT DOCUMENTS

JP 07059898 A * 3/1995 .......... G03G/15/10

* cited by examiner

*Primary Examiner*—Daniel G. DePumpo
*Assistant Examiner*—Daniel Yeagley
(74) *Attorney, Agent, or Firm*—Raymond Y. Chan; David & Raymond Patent Group

(57) ABSTRACT

The present invention relates to an operation arrangement, particularly to an operation arrangement for a twist vehicle having a sliding slot located on an end portion of an driving frame, a pivot shaft located opposite to the sliding slot, a sliding shaft with one end sliding freely along the sliding slot and another end being connected to a rocking arm, a steering shaft being connected directly and perpendicularly to the rocking arm and operated by a steering wheel. As a result, the steering wheel for the twist vehicle can be extended backwardly towards the rear portion of the operating wheels, close to the user's operation position. This arrangement can improve ease of operation by moving the steering wheel towards the user and also maintain better stability by extending the length of the wheelbase and effectively causing the center of gravity to be shifted toward the idle wheel axle.

2 Claims, 4 Drawing Sheets

OPERATION ARRANGEMENT FOR A TWIST VEHICLE

FIELD OF INVENTION

The present invention relates to a twist vehicle, and more particularly to an operation arrangement for a twist vehicle that is stable and balanced while in operation and also easy and comfortable to operate.

BACKGROUND OF THE PRESENT INVENTION

Because twist cars are usually designed as toys for children, the dimensions of the twist car are usually relatively small. Furthermore, since the steering wheel of a twist car is positioned parallel to the ground, the operator must lean her entire body forward in order for the operator to operate the steering wheel. At the same time, the operator's feet can only rest on the footrest that is located on either side of the driving shaft. As a result, the operator's knees will often touch the operator's elbows and thus interfere with the operator's twisting of the steering wheel. In addition, when the operator leans forward to operate the twist car, her center of gravity usually shifts towards the front of the driving frame, causing the twist car to flip or roll over. Thus, the present invention specifically moves the steering, wheel back towards the operator's arms and extends the wheelbase of the twist car, thereby promoting stability, ease of use, and maintaining comfortable operating position.

SUMMARY OF THE PRESENT INVENTION

The main object of the present invention is to provide an operation arrangement for a twist vehicle, and more particularly, a twist vehicle with a steering wheel that is closer to operator's seating position. Common twist vehicles comprise a triangular driving frame that is located behind two driving wheels. The triangular driving frame is connected to and operated manually through a handle bar. When an operator swings the handle bar from left to right, a resulting forward force is generated by the driving wheels' circular motion. But because the triangular driving frame must be operated through the handle bar, as a result, the operator has to operate the twist vehicle within the limited chassis space. The operator must lean forward towards the handle bar that is commonly located in front of the vehicle. Furthermore, the two driving wheels are further extended back towards the idle wheels by the triangular driving frame resulting in a very short wheelbase. The net effect of the common twist vehicle is that the center gravity is too often shifted towards the front of the vehicle and as the operator uses the vehicle, the vehicle has a tendency to tip and flip over. Thus, through this invention, the steering wheel can be shifted backward and the triangular driving frame can be operated through a rocking, arm linkage to move the driving, frame. The wheelbase is also further lengthened as the driving frame is moved forward and, thus effectively keeping the center of gravity within the wheelbase and at a safe position.

Another objective of the present invention is to provide a linkage arrangement for connecting a sliding shaft to the rocking arm and the rocking arm to a steering shaft and the steering shaft to a steering wheel so that the steering wheel can be tilted at an angle. As a result, the operation can be done at a more natural position and thereby increasing the easiness of operation.

DETAILED DESCRIPTION OF THE PREFERRED EMBODIMENT

Figure 1:
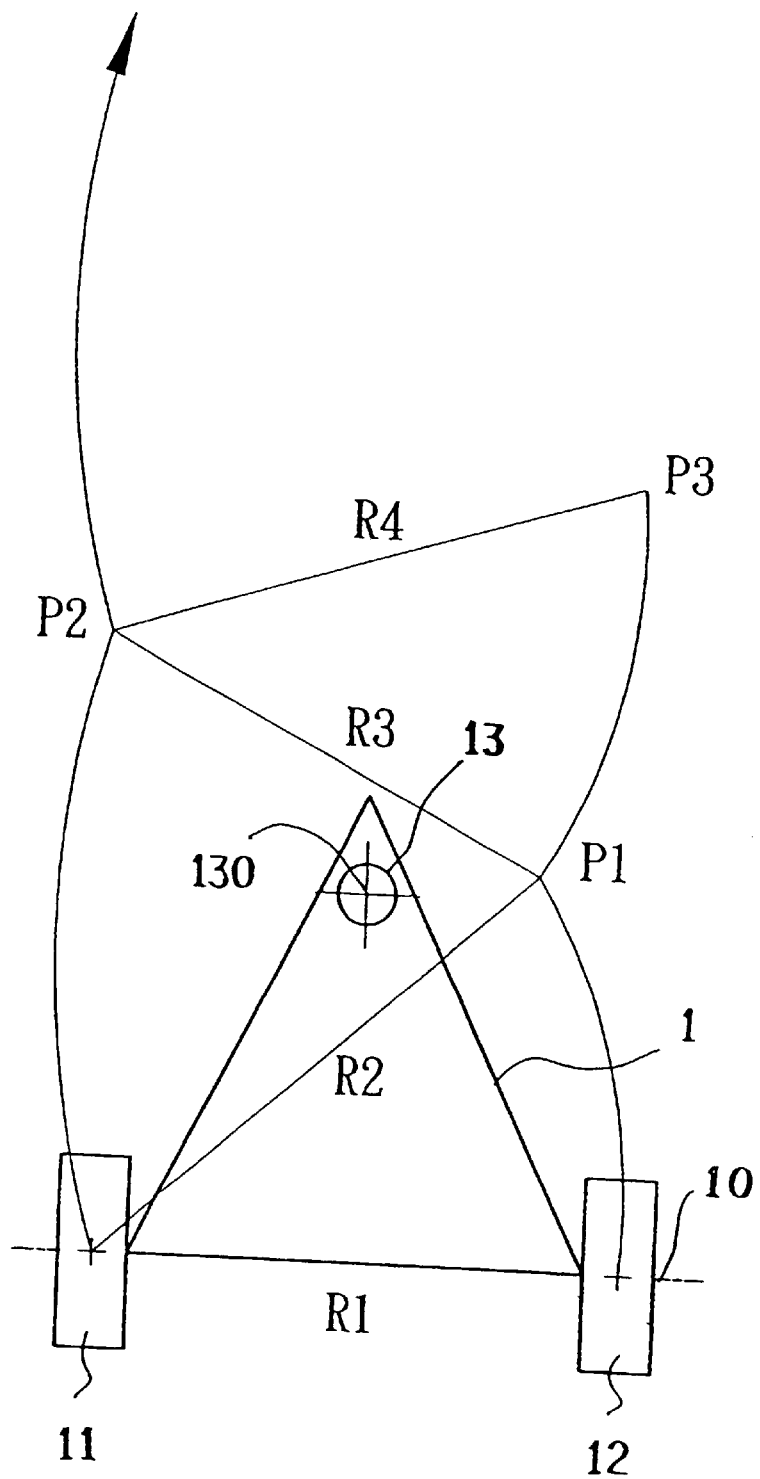
FIG. 1 is a diagram of a principle of forward motion for a driving frame for a twist car.
Figure 2:
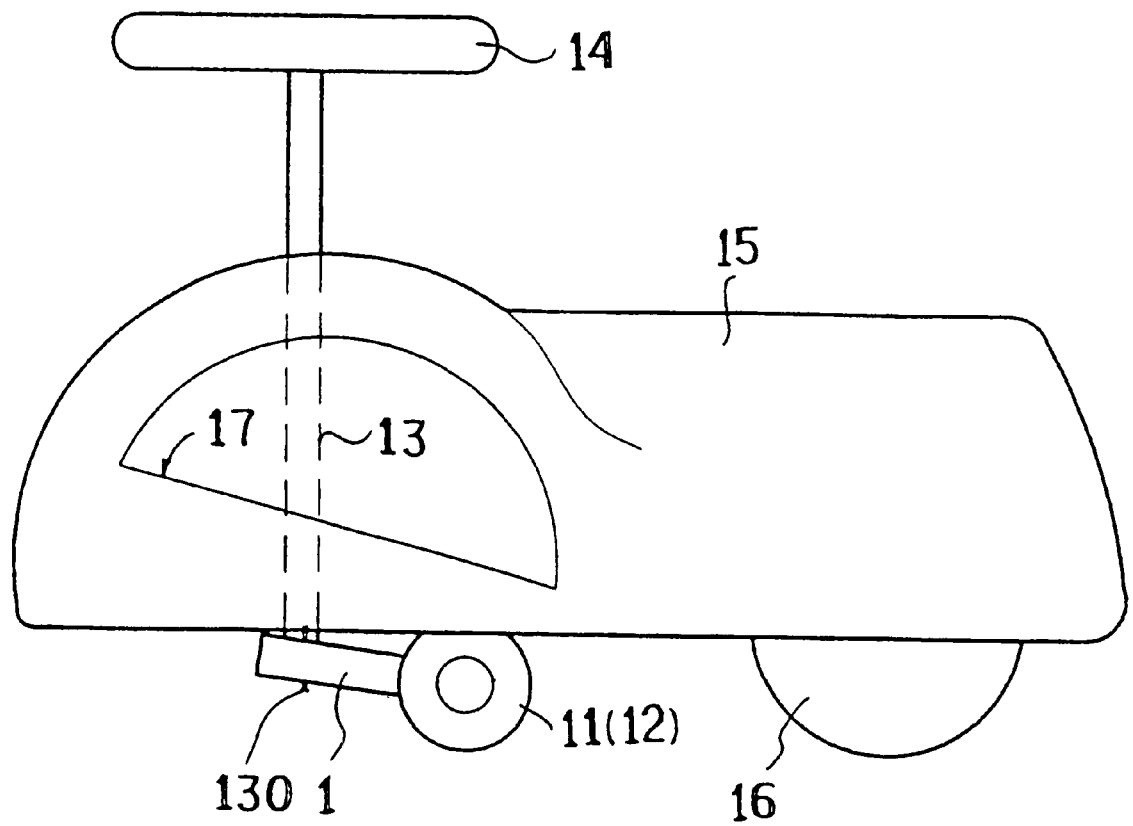
FIG. 2 is a side view of a common twist vehicle.

Referring to FIGS. 1 and 2 of the drawing, a principle driving motion for a twist car comprises a triangular driving frame 1 generally located in the front portion of the twist car. The triangular driving frame 1 has a pivotal point 130 located in the front of the frame. Directly in front of and above the pivotal point 130 is a steering shaft 13 connected to the triangular driving frame 1. The steering shaft 13 can rotate when a user rotates the steering wheel 14. The left and right sides of the triangular driving frame 1 each have a driving wheel 11, 12 rotatably mounted on each respective side. Thus, when the steering shaft 13 rotates the triangular driving frame 1 from right to left, according to FIG. 1, the left driving wheel 11 can be viewed as a center of a circle with the distance between the two wheels serving as a radius RI of the circle and the right wheel 12 will travel forwardly to a new position PI. As the triangular driving frame 1 moves from right to left caused by the opposite rotating motion of the steering wheel 14, the right driving wheel 12 now is stationed and serves as a center of the circle with the distance between the two wheels as R2 and the left driving wheel 11 moves to a position P2 above P1. Immediately after the left driving wheel 11 reaches a new position, the wheel becomes another center for the right wheel 12 to pivot forward to a new position P3 and the radius R3 as the distance between the two wheels. Thus, with the repeated motions of the two driving wheels 11, 12, the pivotal point 130 can travel forwardly. As a result, when a car body 15 is attached to the driving frame 1, the vehicle can thus move forward.

Referring to FIG. 2, a common feature in all twist cars is that in front of the car body 15 is a triangular driving frame 1 shown in FIG. 1. The rear portion of triangular driving frame 1 further comprises two driving wheels 11, 12. Directly above the pivot point 130 is a steering shaft 13 having two ends with one end connected to the pivot point 130 and a steering wheel 14 being connected to another end. The rear portion of a common twist car body 15 comprises two idle wheels 16. When an operator sits on top of the car body 15, the driving frame 1 is swung left and right by the rotating driving shaft 13, which is in turn rotated when the operator rotates the steering wheel 14, and thus drives the twist car in a forward motion.

Figure 3:
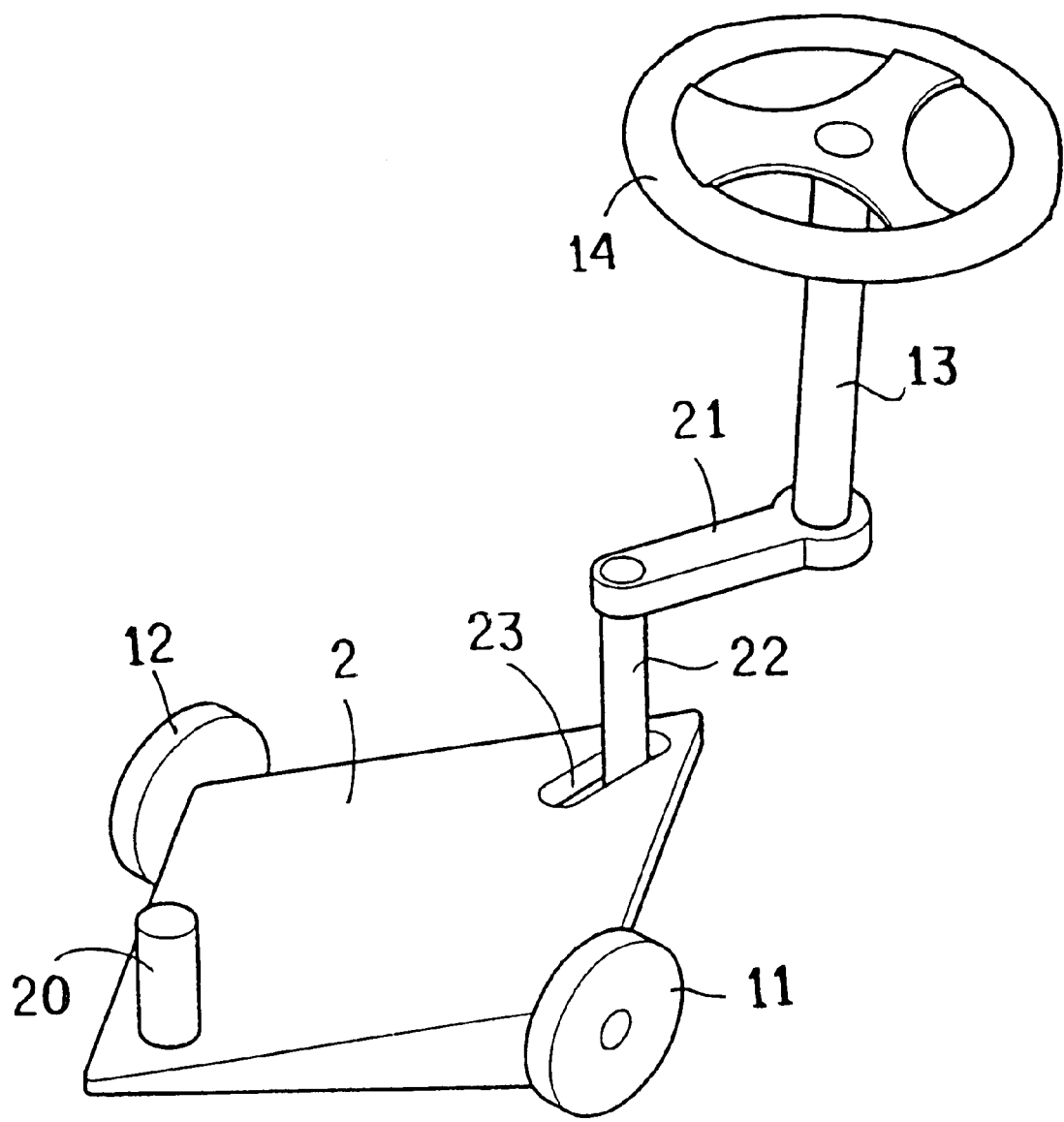
FIG. 3 is a perspective view of an operation arrangement for a twist vehicle according to a preferred embodiment of the present invention.

Referring, to FIG. 3, the present invention comprises a driving frame 2 having two ends with one end having a sliding slot 23 at its end portion. The other end portion of the driving frame 2 has a pivot shaft 20 connected directly on it. The two sides of the driving frame 2 each has a driving wheel 11, 12 rotatably mounted to each respective side. The pivot shaft 20 is rotatably connected to the car body 15. According to FIG. 4, the sliding slot 23 of the driving frame 2 has a sliding shaft 22 slideably inserted into the sliding slot 23. The sliding shaft 22 is connected to and locked by a rocking arm 21. At an end portion of the rocking arm 21 opposite to the end that is connected to the sliding shaft 22 is a steering shaft 13 perpendicularly connected to the rocking arm 21. The steering shaft 13 is rotatably supported and penetrates from bottom to top of the car body 1 5. A steering wheel 14 is connected to the other end of the steering shaft 13. When the user rotates the steering wheel 14, the steering wheel 14 also rotates the steering shaft 13, which in turns rotates the rocking arm 21, which in turns rocks the sliding shaft 22 that is inserted in the sliding slot 23 left to right. The left and right motion of the sliding shaft 22 then causes the driving frame 2 to pivot left and right with respect to the pivot shaft 20 connection point.

According to the preferred embodiment of the steering mechanism, the steering wheel 14 is effectively moved away from the driving wheels 11, 12 and is closer to the middle of the car body 15. As a result, the steering wheel is closer to the operator's arms during operating position.

Figure 4:
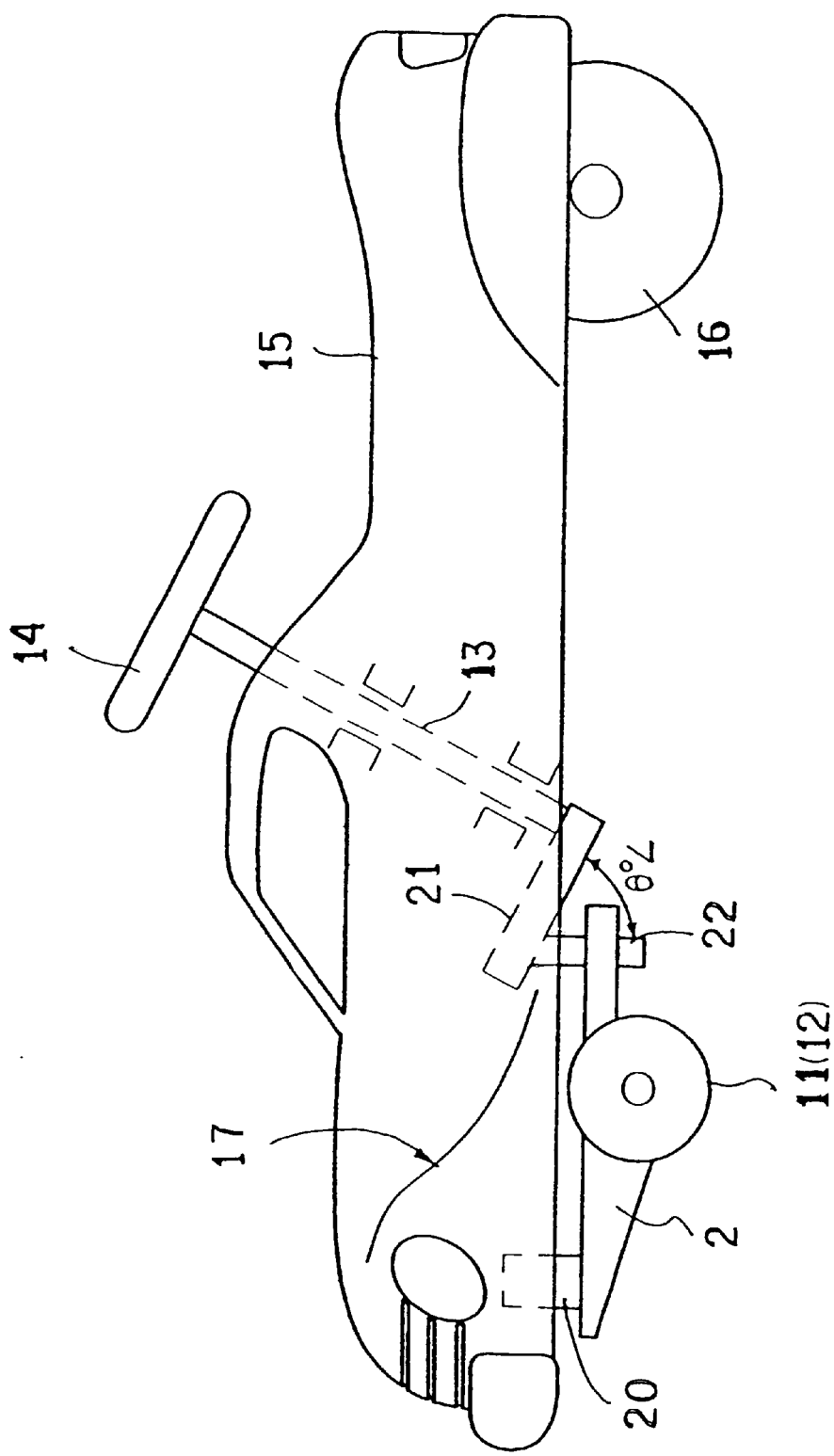
FIG. 4 is a side view of the preferred embodiment of an operation arrangement for a twist vehicle of the present invention.

As shown in FIG. 4, the steering wheel 14 is clearly arranged so that it is in back of the driving wheels 11, 12 with the intent to benefit the operator's ease of use. In addition, because the driving wheels 11, 12 are moved forward towards the front of the car body 15, the overall wheelbase also is increased. The obvious benefit is that the user no longer needs to lean forward to operate the steering wheel and the user can also have a place to rest her feet on the footrest 17 located in the front portion of the car body 15. Because the footrest 17 is located closely to the location of the driving wheels 11, 12, the design effectively distributes the entire weight of the user over the length of the car body 15. The end effect is that the center of gravity is maintained within the wheelbase and further enhances the stability of the twist car.

Referring to FIG. 4, another objective of the present invention is to place the rocking arm 21 at an angle to the sliding shaft 22, and thus causing the angle between the driving frame 2 and the steering shaft 13 to be greater than 90 degrees. Thus, when the rocking arm 21 rotates from left to right, the sliding shaft 22 will rotate the driving frame 2 by moving in and out of the sliding slot 23. Because the steering wheel 14 is placed at an angle, this design will further improve the ergonomic effect and thus increase the comfort of operating the twist car.

What is claimed is:

1. An operation arrangement for a twist car, comprising:
    a car body having a front end and a rear end;
    at least two idle wheels rotatably connected to a rear portion of said car body;
    a driving frame having a front end portion and a rear end portion and a left side and a right side with said front end portion having a pivot shaft with two ends wherein one of said two ends of said pivot shaft fixedly connects to said front end portion of said driving frame and said other end of said pivot shaft fixedly connects to a front portion of said car body, wherein said driving frame having a sliding slot in said rear end portion;
    at least two driving wheels rotatably connecting to said left side and said right side of said driving frame respectively; and
    a steering assembly rotatably passing through said car body and moveably connecting to said driving frame at said sliding slot.

2. The operating arrangement as recited in claim 1 wherein said steering assembly further comprises a sliding rod with two ends, a rocking arm with two ends, a steering shaft with two ends and a steering wheel, wherein said steering wheel is connected to said steering shaft at one of said two ends of said steering shaft and the other end of said steering shaft is connected to said rocking arm at one of said two ends of said rocking arm and the other end of said rocking arm is connected to said sliding rod at one of said two ends of said sliding shaft and the other end of said sliding shaft is inserted through said sliding slot, wherein an angle between said rocking arm and said sliding rod is less than 90 degrees.

* * * * *